Patented Sept. 1, 1936

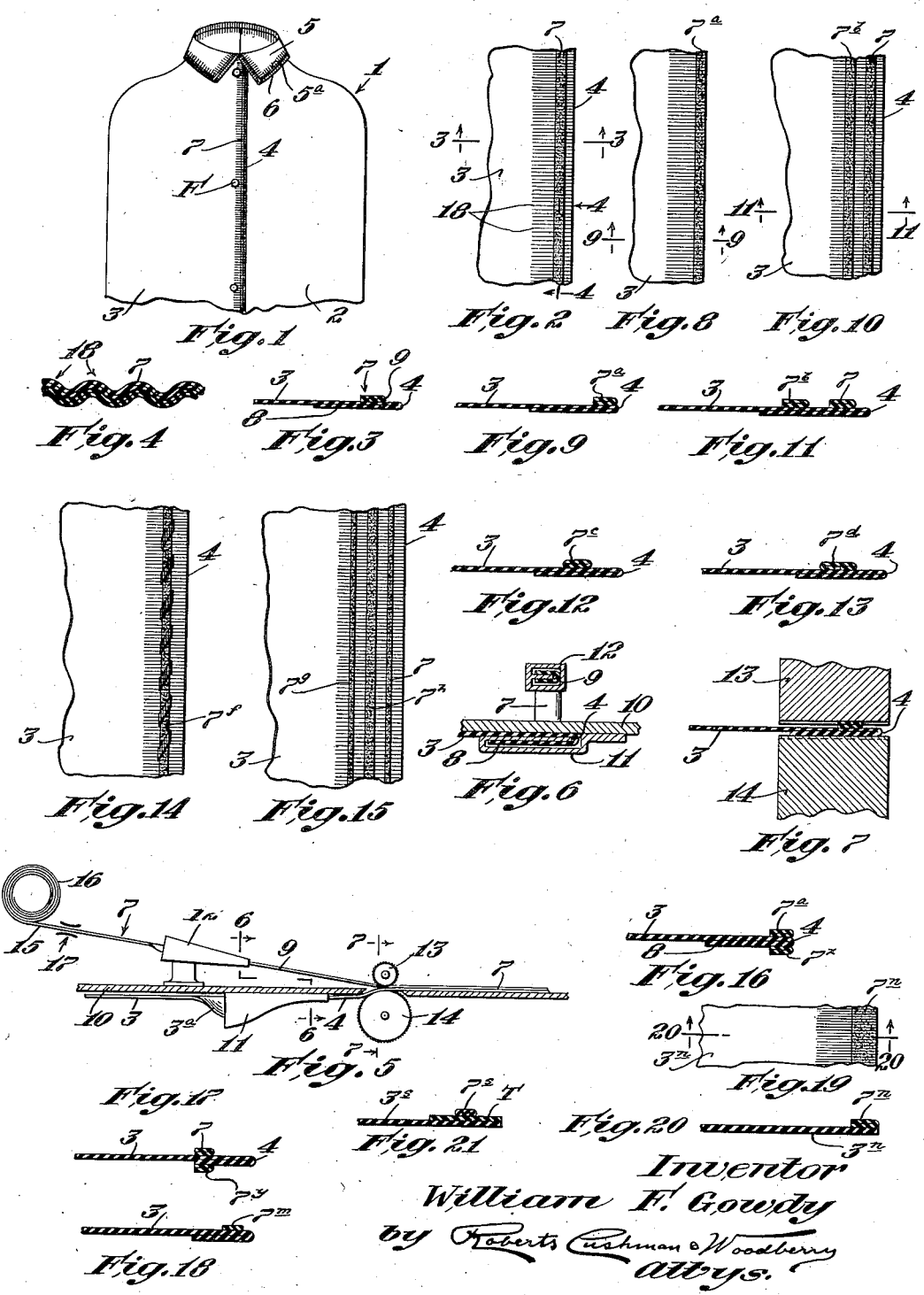

2,053,144

UNITED STATES PATENT OFFICE 2,053,144

FINISH FOR RUBBER GOODS AND METHOD OF MAKING AND APPLYING THE SAME

William F. Gowdy, Milford, Mass., assignor to Archer Rubber Company, Milford, Mass., a corporation of Massachusetts Application October 22, 1935, Serial No. 46,105

9 Claims. (Cl. 154—2)

This invention pertains to the finishing of rubber goods, and relates more particularly to a finish for the marginal portion of an article made from sheet rubber or the like and to a method of making and applying such finish. Articles to which the improved finish may be applied may, for example, be garments such as raincapes or coats, bathing suits or caps, undergarments, aprons, etc., as well as protective bed or crib sheets, table covers, bags, piece goods or the like, and in fact wherever it is desired to reinforce the margin of rubber or similar sheet material and at the same time to impart a neat and ornamental finish.

I am aware that it has been previously proposed to finish the edge of sheeted rubber so as to give it a piped effect, as for instance by uniting a folded narrow ribbon of sheet rubber of a contrasting color to the margin of the body material by a cut seaming operation. However, such method of procedure is not satisfactory since, in accordance with such method, it is necessary to trim away portions both of the body material and the edges of the strip, and since these parts ordinarily are of different colors, the resulting waste or scrap is of little value. Moreover, such method is slow and laborious, requiring great care on the part of the operator in order to ensure effective union of the parts at all points along the seam, and even with the assistance of experienced operators an undue proportion of the work is found, after completion, to be defective and only salable as seconds.

Furthermore, this prior method requires great accuracy in cutting the ribbon-like strip of material in order to obtain the desired effect, since the strip must substantially fill the channel of the folder without binding in order that the folded strip may properly engage the cut-seaming wheel, and even though care be exercised in cutting the strip, it is found in practice that it binds in the folder so as frequently to interrupt the operation. Furthermore, even at its best the prior operation precludes any reinforcement of the margin of the material by folding the body material to form a thickening hem or wale, and provides no latitude in the arrangement of the striping and reinforcing strip since the latter must be limited to the extreme edge of the material without possibility of spacing it from such edge or of providing a plurality of such striping and reinforcing strips, if desired.

In accordance with the present invention a desirable finish is obtainable without encountering any of the difficulties inherent in such prior procedures. No waste or scrap is produced; the margin of the body material may be doubled upon itself to any desired width thereby to strengthen the edge and to provide additional thickness, for example for the application of fasteners; the operation may be performed easily, accurately, rapidly and cheaply and without production of any substantial percentage of defective articles or seconds; the striping and reinforcing strip may be applied as close to or as far from the extreme edge of the article as desired; striping and reinforcing strips of any desired width may be applied at either or both sides of the body material and a plurality of such strips may be applied simultaneously if desired; and preformed strips, individually of ornamental or other special appearance may be used. Furthermore, a highly ornamental effect is produced as the result of the mode of uniting the striping and reinforcing strip to the body material.

In the accompanying drawing wherein certain desirable embodiments of the invention have been illustrated by way of example, Fig. 1 is a fragmentary elevation of a garment, for example a raincoat, shown as typical of the utility of the present invention and illustrative of one embodiment of the invention;

Fig. 2 is a fragmentary elevation, to larger scale, illustrating a portion of the right-hand flap of the garment of Fig. 1;

Fig. 3 is a section, to still larger scale, on the line 3—3 of Fig. 2;

Fig. 4 is a section, to greatly enlarged scale, on the line 4—4 of Fig. 2;

Fig. 5 is a diagrammatic elevation, partly in vertical section, illustrating simple mechanism by means of which the improved method may be carried into effect;

Fig. 6 is a fragmentary vertical section, to larger scale, on the line 6—6 of Fig. 5;

Fig. 7 is a vertical section, to much larger scale, on the line 7—7 of Fig. 5;

Fig. 8 is a view similar to Fig. 2, but illustrating a slight modification;

Fig. 9 is a section on the line 9—9 of Fig. 8;

Fig. 10 is a fragmentary elevation similar to Fig. 2, but illustrating a further modification;

Fig. 11 is a section on the line 11—11 of Fig. 10;

Fig. 12 is a section similar to that of Fig. 3, but illustrating a further modification;

Fig. 13 is a section similar to that of Fig. 12, illustrating another modification;

Fig. 14 is a fragmentary front elevation similar to Fig. 2, but illustrating a striping and reinforcing strip of a different construction;

Fig. 15 is a view similar to Fig. 10, but illustrating another arrangement of striping and reinforcing strips;

Figs. 16 and 17 are sections similar to Fig. 3, but illustrating the application of striping and reinforcing strips to opposite sides of the fabric.

Fig. 18 is a view similar to Fig. 3 but illustrating a further modification;

Fig. 19 is a fragmentary elevation illustrating another modification;

Fig. 20 is a section on line 20—20 of Fig. 19; and

Fig. 21 is a sectional view illustrating a further modification.

Referring to the drawing, the numeral 1 designates generally a garment, for example a raincape, made of rubber sheeting, that is to say, pure gum rubber as distinguished from rubber-coated textile fabric, the garment comprising the left-hand front flap portion 2 and the right-hand front flap portion 3, the latter having the edge 4. The garment is also shown as provided with a collar 5 made of the same material as the main body of the garment and having the lower edge 6. The flap 3, as illustrated, is provided at a point near its edge 4 with a reinforcing and striping strip 7, while the collar is likewise furnished with a similar reinforcing and striping strip 5ª.

Referring to Figs. 2 and 3, it will be apparent that the edge 4 of the flap 3 is a rounded or finished edge resulting from turning under the marginal portion of the flap so as to provide the reinforcing ply 8 at the inside of the garment. This reinforcing ply 8 may be of any desired width, and when caused to cohere to the inner surface of the front flap imparts added strength to the edge of the garment and furnishes additional thickness useful, for example, as an anchorage for fasteners F. The striping and reinforcing strip 7, as shown in Fig. 3, consists of a narrow ribbon of gum rubber sheeting, folded or doubled longitudinally to provide the rounded edge 9. This edge 9 is outwardly presented, that is to say, it faces in the same direction as the rounded edge 4 of the body material, the constituent plies of this reinforcing strip 7 being caused to cohere together, while the strip itself coheres to the front or exposed face of the body flap 3.

In accordance with the preferred method of making this finish, the folded marginal portion of the body material and also the striping and reinforcing strip are transversely corrugated, forming the ribs 18 (Figs. 2 and 4). In Fig. 4 the size of the ribs is greatly exaggerated for purposes of illustration, whereas in the actual garment these ribs are very small and close together, giving a knurled appearance to the marginal portion of the garment. This knurled appearance has the effect of slightly shading the color of the body material and thus adds to the ornamental appearance afforded by the reinforcing strip 7 which in most cases is made of a color contrasting with that of the body material. For example, if the body material be of a blue color, the striping and reinforcing strip 7 may be white.

In accordance with the preferred mode of procedure in preparing the finish above described, mechanism such as illustrated in Figs. 5, 6 and 7 is found useful, although it is contemplated that the operation may be carried out by hand or by other means. As illustrated in Figs. 5, 6 and 7, the machine comprises a work-supporting table 10 having at its under side a scroll folder 11 of a type such as is commonly used as an attachment for sewing machines for the formation of hems, and having a similar but smaller folder 12 mounted above its upper surface. The work-supporting table is provided with an opening below which is arranged the shaft of a crimping wheel 14 having a knurled periphery which cooperates with the crimping wheel 13 having its shaft arranged above the table; one or both of these wheels may be driven from any suitable source of power (not here indicated).

The marginal portion of the body material 3 is fed into the folder 11 which turns it over, as indicated at 3ª (Fig. 5), so as to provide the reinforcing ply 8 and the edge fold 4. The material for forming the reinforcing strip 7 is provided in the form of a ribbon of the desired width which, for example, may be wound upon a spool 16 and which may, if desired, pass through any suitable type of tensioning device 17 on its way to the folder 12. This folder is preferably designed, as indicated in Fig. 6, to double the ribbon 15 and to provide the rounded edge fold 9. The folded body material passes from the bottom folder 11 up and over the crimping roll or wheel 14 while the folded ribbon 15 passes beneath the crimping roll or wheel 13.

At this stage of the process the material, both of the garment and the ribbon, is uncured, and, as the folded parts pass between the rolls 13 and 14, the plies of the folded ribbon are caused to coalesce or cohere while the strip 7 is caused to coalesce or cohere to the upper or outer surface of the body material at the same time that the reinforcing ply 8 is caused to coalesce with or cohere to the under or inner face of the body material. In passing between the rolls 13 and 14, the material is caused to assume a transversely ribbed appearance and the striping and reinforcing strip 7 is compressed and flattened to some extent, depending upon the nearness of the rolls 13 and 14. If desired, it may be flattened so that it substantially merges with the outer surface of the body material. However, ordinarily this reinforcing and striping strip stands out as a distinct wale on the exposed surface of the fabric, and if of contrasting color, the color effect thus becomes more pronounced by reason of its elevation from the general surface of the fabric.

While as illustrated in Figs. 2 and 3 the strip 7 is shown as spaced substantially from the edge fold 4 of the body material, it is not necessary that it thus be spaced, for, as shown in Figs. 8 and 9, the strip 7ª is arranged with its rounded edge very close to the edge fold 4 of the body material. This arrangement gives substantially the same effect as a piped edge, but in accordance with the present method this effect is produced without the disadvantages inherent in prior processes whereby similar results have been attempted.

In Figs. 10 and 11, a further possibility is illustrated wherein the marginal portion of the body material is furnished with a pair of the reinforcing strips 7 and 7ᵇ, respectively, the strip 7 being spaced from the edge 4 as in Fig. 3, while the strip 7ᵇ is spaced from the strip 7 and at a considerable distance from the edge 4.

In Fig. 12 another construction is illustrated wherein the strip 7ᶜ consists of a flattened or collapsed tube of gum rubber. With this arrangement both right and left-hand edges of the strip, as viewed in Fig. 12, are rounded, and when employing such a preformed tube, a simple guide may be substituted for the folder 12 in the machine which assemblies and unites the strip and the body fabric. In Fig. 13 a further modification is illustrated wherein the strip 7ᵈ, although consisting of a folded ribbon, is so folded that the edges of the ribbon are brought into juxtaposition and are wholly concealed, thus producing much the same effect in the finished fabric as that of Fig. 12.

Fig. 14 illustrates a further possibility wherein the strip 7ᶠ is a preformed strip produced, for example, by twisting two ribbons or tubes of uncured gum rubber, the preformed strip then being delivered to the assembling machine and being caused to coalesce with or cohere to the body fabric in passing through the crimping rolls 13 and 14.

In Fig. 15 another arrangement is illustrated wherein strips 7, 7ᵍ and 7ʰ are secured to the marginal portion of the body material, the strip 7ʰ being wider than the strips 7 and 7ᵃ. Obviously other combinations of strips, both in number, spacing and width, may be made in accordance with the present invention and as may be desirable in accordance with the amount of reinforcement required or the appearance to be obtained.

In Fig. 16 the body fabric 3 having the reinforcing ply 8 is shown as provided with a reinforcing strip 7ᵃ closely adjacent to its edge fold 4 on the front face of the fabric and with a similar reinforcing strip 7ˣ at the end or rear face of the fabric also adjacent to the edge fold 4. This provides for an especially heavy edge which may under some circumstances be desirable. In Fig. 17 a slight modification of the arrangement of Fig. 16 is illustrated, wherein the reinforcing strips 7 and 7ʸ at opposite faces respectively of the fabric are spaced some distance from the edge fold 4.

Fig. 18 illustrates an arrangement in which the reinforcing strip 7ᵐ is of but a single thickness crimped to the body fabric 3. While in this arrangement the strip does not have rounded edges resulting from folding and does not furnish as much reinforcement as though it were of double thickness, this arrangement is of utility under some circumstances.

In the construction shown in Figs. 19 and 20 the body fabric 3ⁿ is not doubled at its margin, and the reinforcing strip 7ⁿ, which is crimped to the body fabric adjacent to the edge of the latter, provides the sole reinforcement and finish for the edge of the body fabric.

In Fig. 21 another construction is shown in which, as in that of Fig. 20, the body material 3ˢ is not doubled at its margin. In this instance the reinforce strip 7ˢ is secured to a gum rubber tape T which in turn is attached to the body fabric. The strip 7ˢ may first be united to the tape and the latter then crimped to the body fabric, or both strip and tape may simultaneously be delivered together with the body fabric to the crimping machine and united in a single operation. When so delivering the tape to the crimping machine, it may be desirable to feed it under substantial tension so that when released after being crimped to the body fabric it will contract and provide a fluted or ruffled effect. While in Fig. 5 the reinforcing strip has been shown as being delivered to the upper surface of the body fabric, it is obvious that the strip and also the tape T, if employed, may be delivered so as to engage the under surface of the body fabric in readiness for the crimping operation.

After the reinforce strips have been assembled and crimped to the body material, the body material with its attached strip or strips is then subjected to a curing operation in accordance with any of the usual procedures employed in the manufacture of rubber garments or other articles.

It may be noted that in carrying the above process into effect, no trimming away of surplus material is required, so that no waste results, and that since the reinforcing strip is applied to the face of the body material, no extreme degree of accuracy is necessary to ensure its proper union with the body material. Thus substantially no defective articles are to be expected as the result of the process. Furthermore, the process is one which may be carried out by relatively unskilled operators and at a relatively high speed, since, as above noted, considerably more latitude is permissible in applying the reinforcing strip to the face of the material than is requisite if the reinforcing strip is required to be united to the extreme edge of the body material. It may further be noted, as above pointed out, that the present process permits a great variation in the amount and position of the reinforcement provided, as well as in the ornamental effects incidentally resulting from the employment of this reinforcing strip or strips, and it is to be understood that the invention is not to be limited to the precise arrangements herein disclosed but that it is of broad scope and utility as defined in the accompanying claims.

I claim:

1. Sheet material comprising rubber having a thickened margin and a narrow reinforcing strip cohering to one face of said thickened margin, said margin and the reinforce strip having outwardly presented substantially parallel, rounded edges.

2. Sheet material comprising rubber having a narrow reinforcing strip adjacent to one of its edges, said strip having a rounded edge outwardly presented toward the edge of the sheet material, the strip being crimped to the sheet material and transversely ribbed.

3. Sheet material comprising rubber having a marginal finish including a narrow folded reinforce strip with the fold outwardly presented, said strip cohering to one face of the sheet material and extending parallel to the edge of the sheet material, the strip and the marginal portion of the sheet material being transversely ribbed.

4. An article of manufacture comprising a body portion of rubber sheeting having an edge finish including a marginal fold of the body material and a reinforcing strip parallel to the edge of said marginal fold and cohering to the face of the body material, said strip being of a color contrasting to that of the body material and having a rounded edge disposed outwardly toward the edge of the marginal fold of the body material, the plies of the marginal fold and the strip being all crimped together and being transversely ribbed.

5. That method of finishing sheet material comprising rubber which comprises superposing upon one face of the sheet material a longitudinally folded strip also of sheet material comprising rubber with the fold of the strip disposed outwardly toward the edge of the sheet material, both the sheet material and the strip being in uncured condition, crimping the sheet material and the strip thereby to corrugate them and cause them to coalesce, and thereafter curing the material.

6. Method of forming a garment comprising a body portion of rubber sheeting which comprises folding at least one margin of said body portion while the rubber is uncured to provide a reinforcing ply at the inner side of the garment, folding a narrow ribbon of uncured sheet rubber to form a reinforcing strip, applying the strip to the outer face of the body portion so that it extends parallel to the folded edge of the latter and with its fold presented outwardly toward said folded edge of the body portion and so as to overlie the reinforcing ply, crimping the material to cause the strip and the reinforcing ply to cohere to opposite sides of the body material and thereafter curing the garment.

7. Method of finishing an article having a body portion comprising sheet rubber which comprises as steps preparing a plurality of narrow ribbons of uncured rubber, folding the ribbons to form narrow reinforcing strips each having at least one rounded edge, bringing said strips into face-to-face contact with the body portion of the article before the rubber comprising the latter has been cured and so that such a rounded edge is presented outwardly toward the edge of the body portion, crimping the strips and said body portion to cause them to coalesce, and thereafter curing the article.

8. Method of finishing an article having a body portion comprising uncured gum rubber which comprises as steps preparing a narrow reinforcing strip of uncured rubber, said strip having at least one rounded edge, bringing said strip into face-to-face contact with the body portion of the article in such a position that its rounded edge is presented outwardly toward the edge of said body portion, crimping the strip and said body portion to cause them to coalesce, and thereafter curing the article.

9. Method of finishing an article having a body portion of uncured gum rubber sheeting which comprises as steps providing a tube of small diameter of uncured rubber, compressing the tube and bringing it into intimate contact with a surface of the body portion of the article before the rubber comprising the latter has been cured, crimping the strip and the body portion to cause them to cohere, and thereafter curing the article.

WILLIAM F. GOWDY.